United States Patent Office 3,513,346
Patented May 19, 1970

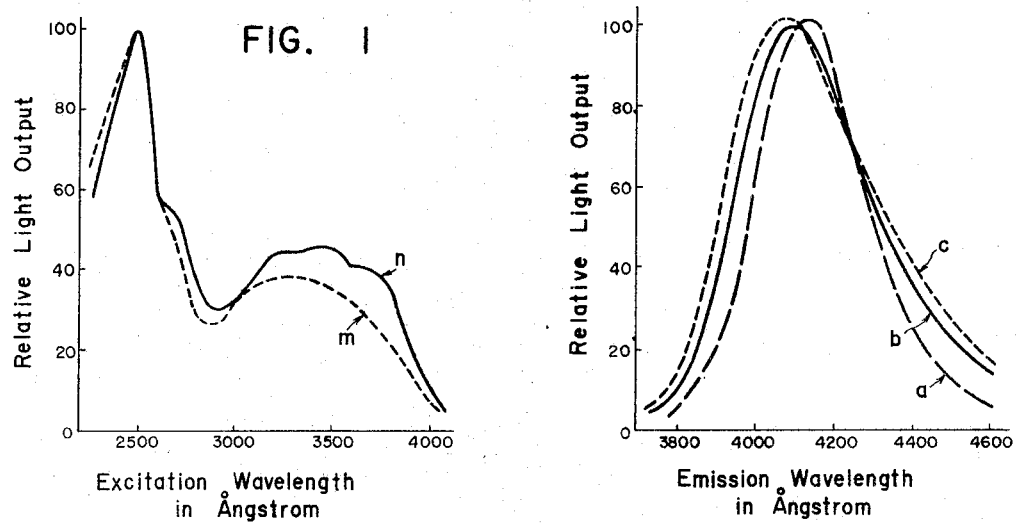
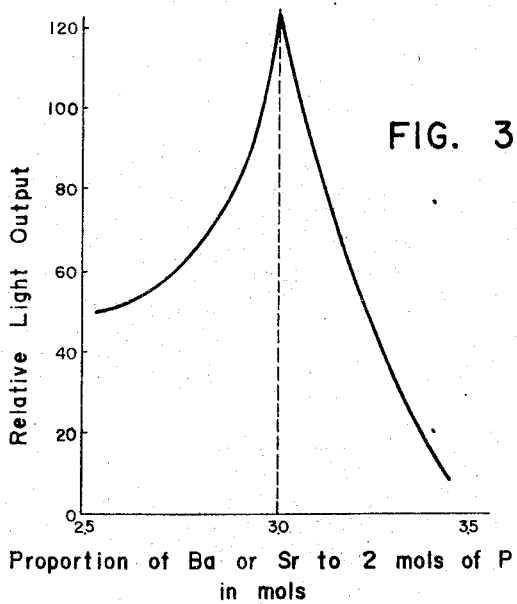

3,513,346
PHOSPHORS AND PROCESS OF
PRODUCING THE SAME
Kenzo Awazu and Kazu Matsunaga, Amagasaki, Japan, assignors to Mitsubishi Denki Kabushiki Kaisha, Chryoda-ku, Tokyo, Japan
Filed June 24, 1966, Ser. No. 560,335
Claims priority, application Japan, June 30, 1965, 40/39,150
Int. Cl. C09k 1/36
U.S. Cl. 313—108
4 Claims

ABSTRACT OF THE DISCLOSURE

A phosphor material is disclosed which is comprised of an orthophosphate of barium, strontium or a mixture thereof as the base matrix and divalent europium as an activator, and wherein the molar ratio of barium and/or strontium to phosphorous is susbtantially 3:2. The present phosphor material provides a maximum light output at a wavelength of from 4,000 to 4,200 A. upon excitation with ultraviolet and cathode ray radiation having a wavelength of 2537 A. The material is suitable for use in mercury vapor discharge lamps such as those used in duplicating apparatuses.

---

This invention relates to phosphor materials suitable for use in mercury vapor discharge lamps such as those used in duplicating apparatus.

The type of diazotized sensitive papers commonly used in duplicating apparatus has generally a maximum sensitivity to radiation having a wavelength of 4000 angstroms of the spectrum. Because of its selective or spectral transparency, however, such a type of sensitive paper has actually a maximum sensitivity to radiation having a wavelength ranging from 4000 to 4200 angstroms of the spectrum.

Accordingly, it is an object of the invention to provide a novel and improved phosphor material capable of providing a maximum light output at a wavelength between 4000 and 4200 angstroms upon exciting the same with an ultraviolet radiation whose wavelength is of 2537 angstroms of the spectrum.

It is another object of the invention to provide a novel and improved process of producing a phosphor material capable of providing a maximum light output at a wavelength between 4000 and 4200 angstroms of the spectrum.

It is an additional object of the invention to provide a novel and improved mercury vapor discharge lamp having a maximum light output at a wavelength of from 4000 to 4200 angstroms of the spectrum.

Briefly, the invention accomplishes the aforesaid objects by the provision of a phosphor material including an orthophosphate of at least one element selected from the group consisting of barium and strontium as a base matrix and divalent europium mixed with the phosphate as an activator, the resulting mixture being fired in a reducing atmosphere, with the molar ratio of barium or strontium or a mixture thereof to phosphorous in the phosphor material being a value of substantially 3:2.

The invention will become more readily apparent from the following detailed description taken in conjunction with the accompanying drawings in which:

FIG. 1 is a graph illustrating the relationship between relative light output and excitation wavelength for phosphor materials prepared in accordance with the teachings of the invention;

FIG. 2 is a graph illustrating emission spectra of the phosphors prepared in accordance with the teachings of the invention upon exciting them with a 2537 A. radiation; and FIG. 3 is a graph illustrating the relative light output of the phosphor material plotted against the mol number of barium or strontium or a mixture thereof added to 2 mols of phosphorous.

The phosphor materials according to the invention have a composition substantially expressed by the formula:

$$M_3(PO_4)_2:Eu$$

where M represents barium, strontium or a mixture thereof. The term "mixture of barium and strontium" used in the specification and the claims means one including any desired proportions of barium and strontium. As shown in the above formula, the phosphor material should include barium, strontium or a mixture thereof and phosphorus in a molar ratio of substantially 3:2.

The preferred examples of the starting materials involve barium and strontium carbonates and hydrogen phosphates of barium and strontium. In addtion, any salt of barium or strontium may be equally used as the starting material provided that the same can be converted into the corresponding oxide by firing and then reacted with phosphorous oxide to form the corresponding orthophosphate. Examples of such salts may involve, for example, barium nitrate, strontium nitrate, barium acetate and strontium acetate.

In order to activate the base matrix, divalent europium should be added to the latter. Europium oxide and chloride have been found to be advantageously used. It has been also found that europium in an amount of from 0.005 to 0.05 mol should be added to the matrix in order to obtain a good brightness of the finished phosphor material.

In practicing the invention, suitable amounts of barium carbonate, barium hydrogen phosphate and europium oxide in the powdered form, for example, may be thoroughly mixed with one another in a suitable ball mill. The resulting mixture is fired in an atmosphere of a reducing gas such as hydrogen or ammonia gas. The firing temperature and time are not critical. However, if the firing temperature is too high the resulting phosphor may be sintered leading to a decrease in light output. On the contrary, if the firing temperature is too low, solid reaction by which a phosphate is formed is not sufficiently effected resulting also in a decrease in light output from the completed phosphor. The results of experiments indicated that the optimum firing temperature should range from 1100° to 1200° C. It has been found that the higher the firing temperature the shorter the firing time will be whereas the less the temperature the longer the time will be with satisfactory results.

The following examples illustrate the practice of the invention.

EXAMPLE I 1 mol of barium carbonate, 2 mols of barium hydrogen phosphate and 0.015 mol of europium oxide in the powdered form were thoroughly mixed with one another in a suitable ball mill. The resulting mixture put in a quartz crucible was fired in an electric furnace having a reducing atmosphere consisting of a stream of nitrogen-hydrogen mixture at 1150° C. for one hour to form a phosphor material. The phosphor material thus formed had a composition expressed by $Ba_3(PO_4)_2:Eu$.

When excited with an ultraviolet radiation having a wavelength of 2537 angstroms of the spectrum, the phosphor provided a maximum light output at a wavelength of 4140 angstroms as shown by curve a in FIG. 2 wherein the ordinate represents the relative light output and the abscissa represents the emission wavelength in angstroms.

The same phosphor material was also excited with radiation while the wavelength of the radiation varied from 2400 to 4000 angstroms. The light output from the phosphor material reached its maximum value when the excitation had a wavelength approximating 2537 angstroms of the spectrum. This is illustrated by dotted curve $m$ in FIG. 1 wherein the ordinate represents the relative light output and the abscissa represents the excitation wavelength in angstroms.

EXAMPLE II

A powdered mixture comprising 0.5 mol of barium carbonate, 0.5 mol of strontium carbonate, 2 mols of strontium hydrogen phosphate and 0.01 mole of europium chloride had added thereto water followed by a sufficiently kneading operation. After having been dried the resulting mixture was fired in a reducing atmosphere similar to that described for Example I at 1100° C. for two hours to form a phosphor material. The phosphor material thus formed had a composition expressed by $$(BaSr)_3(PO_4)_2:Eu$$

The phosphor material has tested and provided a maximum light output at an excitation wavelength of 2537 angstroms of the spectrum as shown by solid curve $n$ in FIG. 1. In FIG. 2, curve $b$ illustrates that this maximum light output is at a wavelength of 4100 A.

EXAMPLE III

The procedure as described in Example II was repeated except for a raw material comprising 3 mols of strontium carbonate, 1 mol of anhydride phosphorous pentoxide and 0.02 mol of europium oxide. The resulting phosphor had a composition expressed by $Sr_3(PO_4):Eu$.

The phosphor was tested and provided a maximum light output at a wavelength of 4050 angstroms when excited with a 2537 A. radiation as shown by curve $c$ in FIG. 2.

Further a series of another series of experiments was conducted with various phosphors produced as above described except for the molar ratio of barium and/or strontium to the phosphate radical varied. The results are illustrated in FIG. 3 wherein the ordinate represents the relative light output and the abscissa represents the mol number of barium and/or strontium per 2 mols of phosphorous. As shown in FIG. 3 the relative light output reached its maximum value when 3 mols of barium, strontium or a mixture thereof existed for 2 mols of phosphorous.

Each of the phosphor materials prepared as described for Examples I to III was applied and fired on an inner surface of a separate tubular envelope for 20 watt fluorescent lamp in an amount of approximately 5 milligrams per square centimeter in the manner well known in the art, the envelope having a diameter of 38 millimeters. The resulting lamps effected printing of sensitive papers to a speed approximately equal to twice the speed of the conventional 20 watt fluorescent lamps with substantially identical results.

The fluorescent lamps according to the invention exhibit a good maintenance of light output in that after being operated for 500 hours they had 90% or more of the initial light output.

In addition it has been found that the phosphor of the invention may have added thereto such a divalent metal or metals as helium, magnesium, calcium, zinc or/and cadmium in a small amount or amounts without its light output characteristics inherently changed. These divalent metals exist in the form of an orthophosphate in the resulting phosphor which phosphates form the corresponding solid solution with the constituents of the phosphor. As a result, the light output characteristics may more or less change because of variations in ion radius and basicity. However, it has been found that this change in light output is tolerable as far as the divalent metal or metals as above described exists or exist in a small amount or amounts in the phosphor.

Further the starting materials from which the present phosphor material is produced may include at least one compound selected from the group consisting of borates, sulfate and halides of an element selected from the group consisting of barium, strontium and europium in order to promote the reactions between the materials during the firing operation.

What we claim is:

1. A phosphor material which provides a maximum light output at a wave length between 4,000 and 4,200 angstroms in response to excitation with ultraviolet radiation of 2537 A. and which consists essentially of an orthophosphate of a metal selected from the group consisting of barium, strontium and a mixture thereof and an activator consisting essentially of divalent europium, in an amount of from 0.005 to 0.05 mol per mol of said metal orthophosphate with the molar ratio of the selected metal to phosphorous being substantially a value of 3:2.

2. A process of producing a phosphor material which provides a maximum light output at a wave length between 4,000 and 4,200 angstroms in response to excitation with ultraviolet radiation of 2537 A. comprising the steps of mixing a compound of phosphorous and at least one salt selected from the group consisting of carbonates, nitrates and acetates of a metal selected from the group consisting of barium, strontium and a mixture thereof in a proportion such that the molar ratio of said selected metal to phosphorous in the finished phosphor material is substantially a value of 3:2 and also divalent europium in an amount such that the resultant base matrix contains 0.005 to 0.05 mol of europium per mol of said base matrix, firing the mixture in a reducing atmosphere at a temperature of from 1100° to 1200° C. thereby to form an orthophosphate of the selected metal providing a base matrix for the phosphor material and activated by said divalent europium.

3. A fluorescent lamp useful as a source of light for duplicating purposes which includes the phosphor material defined in claim 1.

4. A fluorescent lamp according to claim 3 in which said lamp is a mercury vapor lamp.

References Cited

UNITED STATES PATENTS 2,962,616  11/1960  Homer et al. _____ 252—301.4 X
3,294,699  12/1966  Lange _____ 252—301.4

OTHER REFERENCES

Nazarova: Chemical Abstracts, vol. 55, p. 19506 (1961).

Laisaar: Chemical Abstracts, vol. 63, p. 10817 (1965).

TOBIAS E. LEVOW, Primary Examiner

J. COOPER, Assistant Examiner

U.S. Cl. X.R.

252—301.4; 313—109